United States Patent [19]

Hargrove et al.

[11] Patent Number: 4,817,857
[45] Date of Patent: * Apr. 4, 1989

[54] PROCESS FOR RESTRICTED LEAD CONTENT SOLDERING OF COPPER WITH CONTROLLED COPPER CONTAMINATION OF THE MOLTEN SOLDER RESERVOIR

[75] Inventors: Homer G. Hargrove, Maitland, Fla.; Jay L. Kratz, Cherry Hill, N.J.

[73] Assignee: Westinghouse Electric Corp., Pittsburgh, Pa.

[*] Notice: The portion of the term of this patent subsequent to Jan. 6, 2004 has been disclaimed.

[21] Appl. No.: 61,766

[22] Filed: Jun. 15, 1987

[51] Int. Cl.$^4$ .............................................. B23K 31/02
[52] U.S. Cl. ................................... 228/183; 228/222; 228/263.16; 228/263.18
[58] Field of Search ..................... 228/183, 37, 263.18, 228/263.16, 222

[56] References Cited

U.S. PATENT DOCUMENTS

| | | | |
|---|---|---|---|
| 1,720,508 | 7/1929 | Bundy | 228/183 X |
| 2,152,437 | 3/1939 | Lear | 228/37 |
| 3,426,953 | 2/1967 | Metzger | 228/183 X |
| 4,634,044 | 1/1987 | Hargrove et al. | 228/183 |

OTHER PUBLICATIONS

Metals Handbook (8th Ed.), vol. 8, pp. 428–430, Metallographic Structures and Phase Diagrams (ASME).
The Soldering of Sheet Metal Heat Exchangers (4/30/65) Tin Research Institute, Greenford, Middlesex, England (pp. 6–30).
ASTM Spec. B32, p. 1 and 30–38, Nov. 1983 (published Mar. 1984).

Primary Examiner—Kenneth J. Ramsey
Attorney, Agent, or Firm—R. A. Stoltz

[57] ABSTRACT

This is a process which provides the first essentially continuous high tin flow soldering method for attaching copper-based fins to non-copper-based tubing. This invention avoids sludge buildup in the reservoir and generally avoids lead carbonate formation when the heat produced having a braze-like joint with eta phase layers exchanger is in service. In addition, a novel structure is adjacent to copper-containing surfaces. The invention utilizes an essentially lead-free, high tin solder cascade onto a preferably cool tube, genrally with a limited time of contact between the liquid solder and the tube, and with a combination air quench and wipe to remove excess solder and solidify the remaining solder. Thus a braze-like joint is achieved having better heat conduction and closer thermal expansion match. This finned heat exchanger tubing is generally useful for liquid to gas-type heat exchangers.

8 Claims, 2 Drawing Sheets

PROCESS FOR RESTRICTED LEAD CONTENT SOLDERING OF COPPER WITH CONTROLLED COPPER CONTAMINATION OF THE MOLTEN SOLDER RESERVOIR

CROSS-REFERENCE TO RELATED APPLICATION

An essentially continuous high tin flow soldering method for attaching copper based fins to copper-based tubing is described in the now-allowed application Serial No. 784,431 now U.S. Pat. No. 4,634,044 assigned to the same assignee. The invention avoids sludge buildup in the reservoir and generally avoids lead carbonate formation when the heat exchanger is in service. In addition, a novel structure is produced having a braze-like joint with eta phase layers adjacent to the copper-based surfaces. That invention utilizes an essentially lead-free, high tin solder cascade onto a preferably cool tube, generally with a limited time of contact between the liquid solder and the tube, and with a combination air quench and wipe to remove excess solder and solidify the remaining solder. In that application, it was not appreciated that similar problems existed in attaching copper-based fins on non-copper-based tubing.

BACKGROUND OF THE INVENTION

1. Field of the Invention

This invention relates to metal fusion bonding and in particular to a process and product where copper-based fins are joined on non-copper-based heat exchanger tubing using a high tin solder.

2. Description of Related Art

Finned heat exchanger tubing has been used for a variety of gas to liquid heat exchangers. As used herein the phrase "gas" includes all elastic fluids, including, for example, vapors. The term "copper-based fins" includes copper as well as copper alloys which contain at least 50% copper. In addition, the term "non-copper-based tubing" includes tubing without copper as well as copper containing alloys which contain less than 50% copper. In the power generation industry, finned heat exchanger tubing is used in, for example, hydrogen coolers, exciter air coolers and as well as turbine lubrication oil coolers and generation seal oil coolers.

The conventional method of attaching copper fins to tubing utilizes tin-lead solder and can be either a flow solder or a dip solder type process. While high tin solder has been used for hand soldering of copper-based parts, such a solder has a very limited application on a production basis. During dip-soldering of copper-based material with high tin solders, the solder in the reservoir quickly picks up about 2% copper (depending on temperature). As this solder further reacts with the copper-based surfaces the copper and tin form intermetallic compounds, most notably the "eta phase" compound $Cu_6Sn_5$. The eta phase, having a higher melting point than the solder, will precipitate as a "sludge" which builds up and eventually renders the solder unusable. Such high tin processes have been dipped soldering processes rather than flow soldering due to the difficulty of pumping a sludge containing solder. High tin solder reservoir reprocessing on-line to eliminate the eta phase from the reservoir would generally be impractical as the eta phase sludge would be difficult, if not impossible, to pump into a reprocessing system. Because of sludge buildup problem, such high tin soldering is generally too expensive to do even with a dip process due to the expense of either replacing or reprocessing solder. As used herein, the phrase "high tin" means containing at least 75% tin.

As a result of the problems with high tin soldering, heat exchangers such as hydrogen cooler (which is used to cool hydrogen gas which is in turn used to cool the generator in an electric power plant) have used tin lead (e.g. 20 tin–80 lead) solder to solder copper fins onto tubing. It has been discovered, however, that impurities in the generator internal environment can react with the lead in the solder to form lead carbonate which can short out electrical windings of the generator.

SUMMARY OF THE INVENTION

It has been discovered that copper fins can be continuously soldered to non-copper-based tubing, but that eta phase formation must be avoided, such as by process described herein. This invention provides the first essentially continuous, high tin, flow soldering method for attaching copper-based fins to non-copper-based tubing.

While the eta phase is still formed, it is maintained adjacent to the copper-based surfaces, both providing an improved product and avoiding sludge buildup in the reservoir. This allows a continuous production process (as used herein the term "continuous" means that the process does not have to be interrupted periodically for replacing or reprocessing of the solder bath).

The product is a non-copper-based tube and a copper-based fin with a high strength, essentially lead-free joint. In some ways the joint resembles a braze, having an intermetallic compound layer on the surfaces.

This method provides for a continuous metal fusion bonding of copper-based fins to non-copper-based heat exchanger tubing without solder bath reprocessing and utilizes steps of; assembling fin material on the tubing, applying flux to the fin-tubing assembly, controlling an essentially lead-free, high tin solder reservoir to a controlled temperature of less than 150° F. (and preferably 80°–120° F.) above the top of the melting range of the solder, flowing solder from the reservoir on the assembly, and wiping the assembly with an air quench within 15 seconds (and preferably within 2–5 seconds) of initiation of soldering, whereby the solder is rapidly solidified and the high melting copper-tin alloy (eta phase) which is formed is retained adjacent to the fin (and possibly tube) surfaces, thus limiting copper buildup in the reservoir and avoiding sludge formation in the reservoir. Preferably the solder reservoir contains about 5–6% antimony, 1.8–2.2% copper, less than about 0.22% lead, with the balance essentially tin and is generally maintained at 560°–570° F. and the solder is flowed on a given portion of the fin wrapped tube for less than about 10 seconds. Generally, the product of the time the molten solder is on the tube (the time between when a portion enters the solder cascade and when it is quenched) multiplied by the degrees F of the solder above the top of its melting range should be less than about 2500 (and preferably less than 1500).

In practice, the solder (containing the captured eta phase) remaining on the finned tube after passage through the cascade and air quench, is but a small fraction of the total solder flowing in the cascade. The excess solder, still eta phase free after passage over the fin-tube assembly, is captured and retained by appropriate piping to the heated reservoir for subsequent recycling to the cascade.

The improved finned heat exchanger tube of this invention has a copper-based fin surface metal fusion bonded to a non-copper-based tube surface and utilizes an inner layer immediately adjacent to the copper-based fin surface (and possibly a second inner layer immediately adjacent to the tube, if there is some copper content in the tube), with the inner layer principally comprising eta phase copper-tin. An essentially lead-free (less than about 0.22% lead), high tin solder outer layer is positioned immediately adjacent to the inner layer and the tubing. Preferably the solder layer also consists essentially of 5-6% antimony, 1.8-2.2% copper, less than about 0.22% lead, with the balance being tin.

BRIEF DESCRIPTION OF THE DRAWINGS

This invention can be best understood by reference to the following drawings, in which.

DESCRIPTION OF THE PREFERRED EMBODIMENTS

Figure 1:
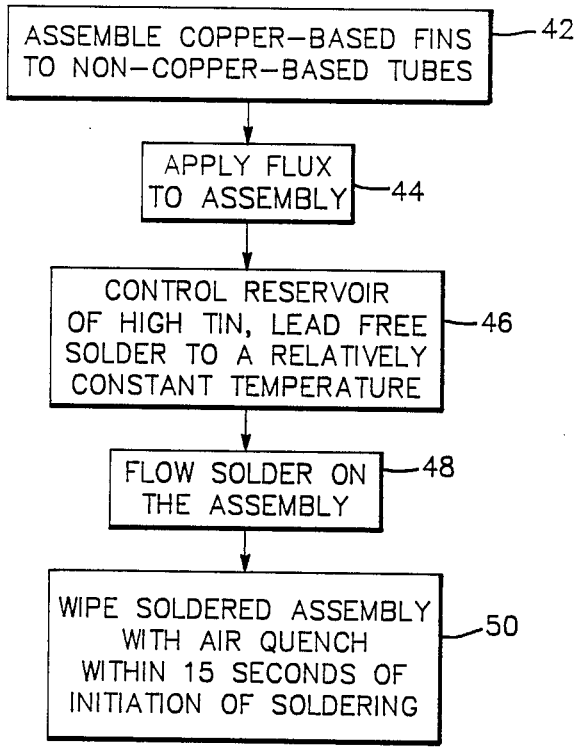
FIG. 1 is a block diagram of the steps of the process of this invention.

This invention provides a process and an article wherein copper-based fins are attached to non-copper-based heat exchanger tubing by an essentially lead-free, high tin solder in a continuous manner by a flow-type process. This invention avoids sludge buildup in the reservoir during manufacture of the finned tubing and lead carbonate formation during operation of the heat exchanger. The avoidance of the sludge buildup allows flow soldering and a novel structure is obtained in which a braze-like joint is produced. While the cascade process was developed to attach copper-based fins to copper-based tubing, it has been determined that the eta phase copper is washed primarily from the copper-based fins. Therefore, it has been found that in order to practically solder copper-based fins onto non-copper-based tubing, the cascade method using restricted lead contents solder must be employed.

In a preferred embodiment, tin-antimony solder (preferably 95 tin-5 antimony solder which has a 464° F. liquidus) is used and is added both initially and also periodically (continuous feed of make-up solder can also be used) to the reservoir. During practice of this invention, excess solder in the cascade flow is returned to the reservoir and copper (generally from the fins) starts to build up in the reservoir, approaching the solubility limit of copper in tin at the reservoir temperature. Although the system can be operated at higher reservoir temperatures where the copper content can reach 3% (all percentages herein are weight percents), at the preferred temperatures at about 560°-570° F. the copper content will build up to about 1.8-2.2% copper. When this solder contacts the copper-based surfaces, additional copper from the surfaces goes into the solder and forms the eta phase which is maintained on the tubing (rather than being entrained with excess solder flow which is returned to the reservoir). This both forms an improved bond and avoids sludge formation in the reservoir. Maintaining the eta phase on the fin-tubing assembly is critical to this invention and results from a limited time exposure at high temperature. The tube-fin assembly need not be preheated prior to soldering. Preferably, the solder temperature is approximately 80°-120° F. over the top of its melting range (the "liquidus point") and the solder is flowed on the tube for less than about 10 seconds. Reservoir temperature fluctuations should be minimized as even relatively small (e.g. 20° F.) reductions can cause eta phase precipitation in the reservoir, and thus control of reservoir temperature is essential. An air wipe-quench is used within about 5 seconds (and preferably less than about 2) after soldering, not only to remove excess solder, but also to rapidly cool the assembly down below the melting range of the solder. Preferably the air used in the quench is not preheated and most preferably room temperature air is used.

Non-copper-based tubing materials which can be finned with copper-based fins by the cascade method using restricted lead content solder include austenitic stainless steels such as 304 and 316, high chrome stainless steels such as AL6X and AL6XN, polystabilized steels such as 294C, aluminum bronze, silicon bronze and monel (which has less than 50% copper, typically 30% copper and 70% nickel). The copper fins are generally formed by a multistage rolling process from essentially 100% copper rod or wire stock material conforming to ASTM B-5.

This is a soldering process and product for attaching copper or copper-alloy fins to non-copper-based tubing. Although a conventional 95 tin-5 antimony (ASTM spec B32 grade Sb5) solder can be used, this is a novel use for the solder with compositional limits on solder and reservoir impurities. Further the process uses the narrow melting range ($-14°$ F.) of the high tin solder to advantage in capturing the eta phase. This process affords considerable savings by essentially eliminating the need for solder scrapping (or reprocessing to recover expensive tin). The process is especially useful for hydrogen cooler tubing as the solder composition and process employed permit control of lead to low impurity levels to essentially eliminate the hydrogen cooler tubing as a source of lead carbonate shorting and tracking in generator windings. Equally important, this solder process also provides a unique means for control of copper accumulation in the solder reservoir, providing a very economical alternative to expensive high tin solder reprocessing/recovery charges and, therefore, lowering the cost of finned tube production.

This process also provides a more uniform fin-to-tube bond than previous processes. Experiments have shown that high tin solder, when used to bond copper fins to non-copper-alloy tubing in the cascade soldering process described hereinbelow, will essentially eliminate this finned tubing, when used in hydrogen coolers from being the source of white (or "acid") lead carbonate $2PbCO_3\cdot Pb(OH)_2$ fouling of electrical generator windings.

The copper fin materials are preferred for their desirable heat transfer characteristic. Copper, however, exhibits a solubility with molten tin of the high tin solders and forms intermetallic compounds, most notably the "eta phase" compound, $Cu_6Sn_5$. The eta phase, having a much higher melting point than the solder will precipitate in conventional bath-type dip soldering systems, gradually building up over a period of time and eventually rendering the solder unusable.

However, in this invention, the dip-soldering method is entirely replaced by a cascade type of flow process. In this process, a cascade or "waterfall" of solder is poured over a tube-fin assembly (preferably the fin is tension-wound in a spiral manner on the tube exterior). Prior (and preferably immediately prior) to soldering, the tube-fin assembly is bathed in a flux. The flux can also be cascaded over the tube and fins. To assure uniform and complete application of flux and solder, the tube-fin assembly generally is simultaneously rotated about its longitudinal axis and advanced along its longitudinal axis under the flux and solder cascades. Upon leaving the soldering station, the finned tube is subjected to a jet of air issuing from a nozzle to remove excess molten solder from the finned tube assembly and solidify the solder with the eta phase retained adjacent to the fin surfaces. The rotational and advancement speed of the fin and tube assembly and the location direction and force of the air wipe can all be controlled to achieve the desired fin-to-tube bond as determined by fin pull-off testing of the soldered assembly. Setting these variables is dependent on tube size, and number of fins per inch of tubing. Excess solder from the cascade and air wipe is returned to a reservoir and recycled back to the cascade.

When this cascade process was used for soldering fins to tubing using typical 20% tin-80% lead solders, the joints obtained were often of low pull off strength (about 2 pounds). The solder, of course, also contained lead which was undesirable, especially for hydrogen coolers. Conversely, the process of this invention gives a minimum of 3 pounds and an average of 4.0 pound pull off strength and contains only minor amounts of lead impurity.

Solders having high tin and low lead content have a very narrow range between solid and liquid (melting range). This invention utilizes this narrow melt range characteristic to create a superior bond while eliminating eta phase contamination of the solder reservoir. Generally the reservoir is operated at about 560°–570° F. with copper building up to about 2% during operation. When the fin-tube assembly (typically at between 70° F. and 100° F.) is rotated and advanced under the solder cascade, the solder will solidify at such a rate, aided by the air wipe, to essentially trap all of the higher melting eta phase next to the copper fin as the solidifying solder quickly passes through the 95 Sn-5Sb solder's approximately 14° F. melt range.

Metallographic examinations reveal that the fins have a nearly uniform coating of trapped eta phase covered by a coating of solder and that this solder coating has the same compositional range as found in the molten solder reservoir; that is, up to 0.22% lead, 1.8–2.2% copper, 5–6% antimony, with the balance being tin and incidental impurities present in the ingot solder. Metallographic examination of the solder reservoir samples showed virtually no eta phase precipitate contamination, with the copper content (1.8–2.2%) representing the solubility limit of copper and tin at the process temperature of 560°—570° F.

FIG. 1 shows a block diagram of this process. The copper-based fins are assembled to the non-copper-based tube as recited in block 42, the assembly is then fluxed as recited in block 44, the reservoir of high tin, lead-free solder is controlled to a relatively constant temperature as recited in block 46, and high tin solder from a controlled temperature reservoir is flowed on the assembly as recited in block 48. An air quench which is applied within 15 seconds of initiation of soldering, as recited in block 50, wipes solder from the assembly and rapidly solidifies the solder. This maintains the high melting copper-tin eta phase alloy on the assembly, rather than allowing it to go into the reservoir along with solder returning to the reservoir.

Figure 2:
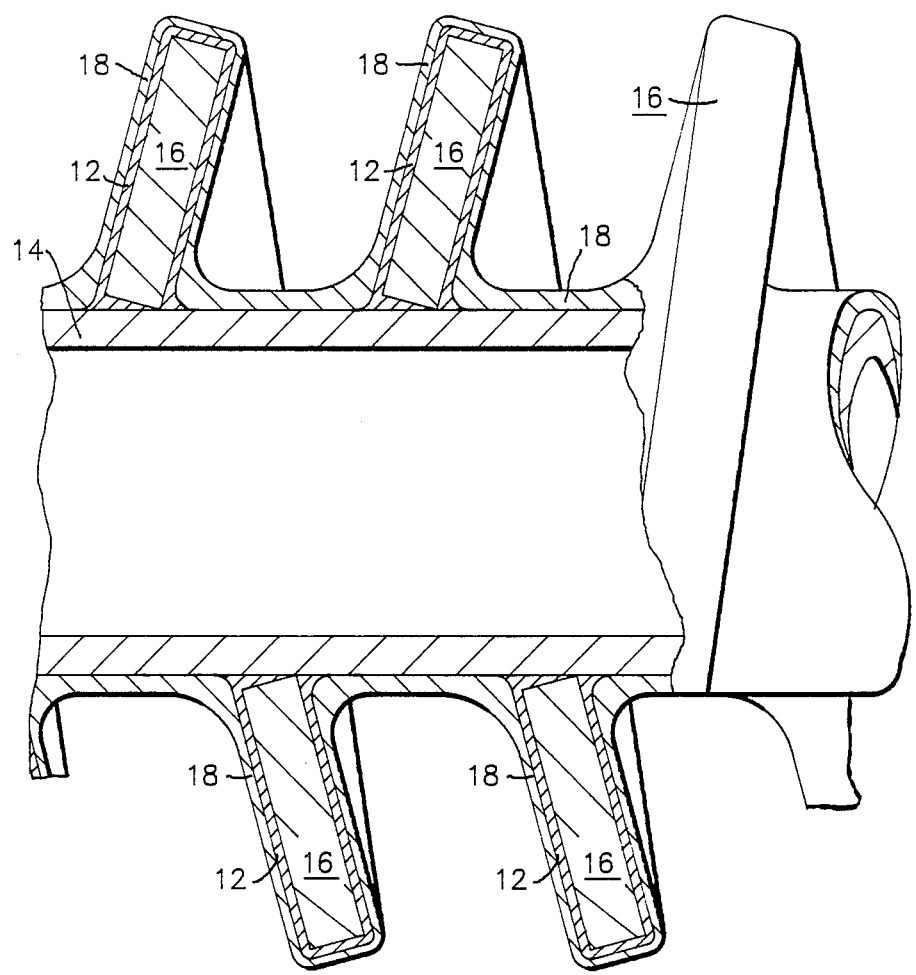
FIG. 2 shows a short portion section of the article of this invention, including the eta phase copper-tin layer adjacent to fin surfaces.

FIG. 2 shows an embodiment of the product, wherein inner eta phase layers 12 are immediately adjacent to the copper fin surface 16, and the outer layer 18 is of high tin solder, essentially having the composition of the solder in the reservoir during production of the product. The eta phase layer thickness is not shown to scale and actual thickness has been measured at about 0.00014 inch. Although the process is basically a soldering process and utilizes soldering-like temperatures of less than 800° F., the product has a bond which has some brazing-like characteristics, and in particular has an intermetallic layer at the fin surfaces. This provides a very high strength joint of excellent consistency and a very desirable coefficient of thermal expansion (in between that of the fins, and that of the solder).

Figure 3:
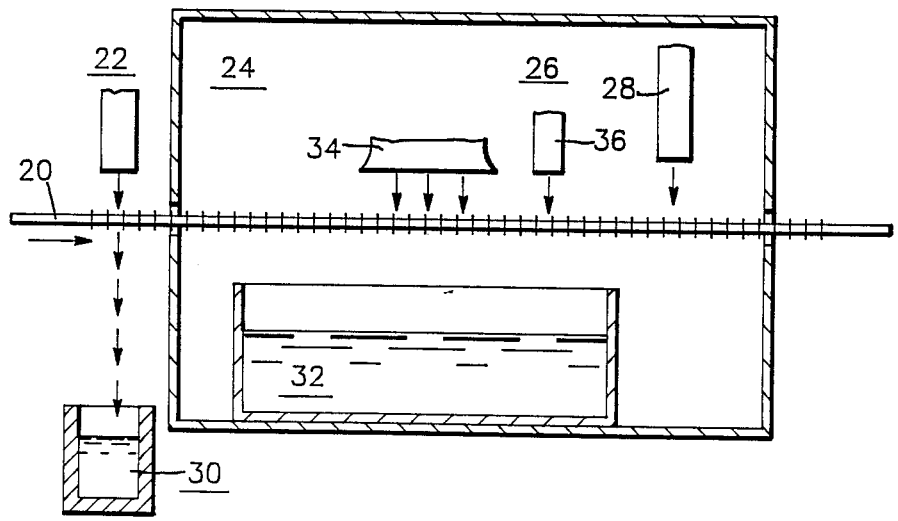
FIG. 3 shows an elevation, partly in schematic form, of the apparatus to practice this process and produce this product, and in particular shows a cascade type flow soldering arrangement.

FIG. 3 shows an elevation of an apparatus to perform this process. In this embodiment, tension wound fins have been assembled on the tubing exterior and the assembly 20 advances and rotates on its longitudinal axis through the fluxing operation 22, the soldering operation 24, and the air quench/wipe operation 26. Also shown is the heated water stream 28 used to remove the flux residue. In particular, the flux is pumped from a reservoir 30 and cascaded over the tube-fin assembly. Preferably the flux is a water soluble, organic-based flux, which is free of both ammonia and chloride. Solder is pumped from the solder reservoir 32 to the solder nozzle 34. In one embodiment, the nozzle 34 provides a cascade about nine inches long and the assembly is moved through the cascade at slightly less than two inches per second and thus a given portion of the tube is under the cascade for about five seconds. The air nozzle 36 is located a few inches from the end of the solder cascade and returns solder to the solder reservoir. Thus, the quench solidifies the solder on an assembly portion in less than 15 (and preferably less than 8) seconds from the time that portion entered the solder cascade. As noted above, the flux is preferably water soluble, and thus heated water can be used to remove flux residue.

The high tin cascade process provides a superior and more uniform copper fin-to-tube bond (as compared to that obtained with the tin-lead solders) and eta phase contamination of the solder in the reservoir is substantially eliminated. This results in a substantial reduction in finned tube costs as solder reprocessing is eliminated and provides a lead content restricted to low (impurity) levels. As a result, the finned tubing is essentially eliminated as a source of white lead carbonate fouling. Lead carbonate fouling is undesirable in any application, but, as noted above, is especially to be avoided in electrical generators which use hydrogen cooling.

The invention is not to be construed as limited to the particular examples described herein, as these are to be regarded as illustrative, rather than restricted. This invention is intended to cover all processes and articles which do not depart from the spirit and scope of the invention.

We claim:

1. An improved method for continuous metal fusion bonding of copper-based fin to non-copper-based heat exchanger tubing, said improved method comprising
   a. assembling said fin to said tubing;
   b. applying flux to said fin-tubing assembly;

c. controlling the temperature of an essentially lead-free, high tin solder reservoir;

d. flowing solder from said reservoir on said fin tubing assembly;

e. returning excess solder to the reservoir; and f. wiping each portion of said soldered finned tubing with an air quench in less than 15 seconds from the time that solder was flowed on that portion and return the excess solder wiped from said finned tubing to said reservoir, whereby the solder is rapidly solidified and essentially all of the high temperature melting copper-tin alloy which is formed is retained adjacent to the fin surfaces thus avoiding copper-tin alloy sludge formation in the reservoir.

2. The process of claim 1, wherein said flux is water soluble, and is essentially free of ammonia and chloride.

3. The process of claim 1, wherein said solder is a tin-antimony solder which contains less than about 2.2% copper and the temperature of the reservoir is controlled to less than about 150° F. above the liquidus point of the solder.

4. The process of claim 3, wherein said solder contains 5.0–6.0% antimony, 1.8–2.2% copper and less than about 0.22% lead.

5. The process of claim 4, wherein essentially 95 tin, 5 antimony solder is at least periodically added to said reservoir.

6. The process of claim 4, wherein said solder reservoir is maintained at a temperature of about 560°–570° F.

7. The process of claim 1 wherein said solder is flowed on a given portion of said fin tubing assembly for less than about 10 seconds.

8. A method for continuous metal fusion bonding of copper-based fin to non-copper-based heat exchanger tubing without solder reservoir reprocessing, said method comprising:

a. assembling said fin to said tubing;

b. applying a flux which is water soluble, and is essentially free of ammonia and chloride to said fin-tubing assembly;

c. controlling a solder reservoir containing solder consisting essentially of 5.0–6.0% antimony, less than about 2.2% copper, less than about 0.22% lead, and a balance of tin to a temperature of 560°–570° F;

d. flowing said solder from said reservoir on said fin-tubing assembly, limiting the time said solder is flowed on a given portion of said fin-tubing assembly to less than about 10 seconds, and without preheating said fin-tubing assembly;

e. capturing excess solder and returning said excess solder to said reservoir;

f wiping said fin-tubing assembly with an air quench of non-preheated air and return the excess solder wiped from said finned tubing to said reservoir, limiting the time between soldering and wiping to less than 5 seconds, whereby said solder is rapidly solidified and essentially all of the high temperature melting copper-tin alloy which is formed is retained adjacent to the fin surfaces thus avoiding copper-tin alloy sludge formation in said reservoir; and g. at least periodically adding essentially 95 tin, 5 antimony solder to said reservoir.

* * * * *